United States Patent Office 3,826,757
Patented July 30, 1974

3,826,757
ROOM TEMPERATURE NEMATIC LIQUID CRYSTALS
Shi-Yin Wong, Santa Monica, Calif., assignor to Hughes Aircraft Company, Culver City, Calif.
No Drawing. Filed Sept. 18, 1972, Ser. No. 290,197
Int. Cl. C09k 1/02
U.S. Cl. 252—408                                           12 Claims

ABSTRACT OF THE DISCLOSURE

The present invention involves formulation of room temperature nematic liquid crystals involving compounds which are solid at room temperature, but when dissolved in certain solvents become true liquid crystals.

BACKGROUND OF THE INVENTION

There has been an increasing search for effective room temperature nematic liquid crystals. French Pat. No. 1,537,000 has reported nematic liquid crystals for use in the dynamic scattering mode (DSM). Of the mixtures reported therein, only one exhibits solid-mesophase transition at room temperature, but the DSM effect is above room temperature.

DETAILED DISCLOSURE OF THE PRESENT INVENTION

The present invention is concerned with formulations which show DSM at room temperature. The compositions are also useful in ultraviolet-activated cells. The compounds used herein are solid at room temperature, but can be dissolved in certain solvents to produce solutions which are true room temperature nematic liquid crystals.

The solvents useful in the present invention are: p-methylbenzylidene-p-n-butyl aniline and p'-n-butyl-phenyl-p-methyl benzoate. These solvents exhibit no nematic mesophase at room temperature by themselves, but when certain solid nematic liquid crystals are dissolved therein, they become effective room temperature nematic liquid crystals.

The solid compounds used in the present invention correspond to the formula

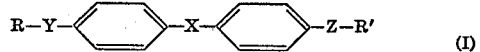

wherein $$X = -CH=N- \text{ or } -\overset{O}{\underset{\|}{C}}-O-;$$

R and R' are each alkyl having from 1 to about 10 carbon atoms;

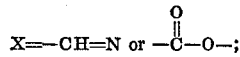

and

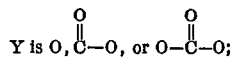

or a direct bond.

The method for making these compounds has been reported in Vogel, Practical Organic Chemistry, Longmans (pp. 653–654).

In preparing the solutions of the present invention, the compound of Formula I is dissolved in one of the named solvents in order to form a solution. Preferably, the composition will contain 20 to 50 percent, by weight, of the solvent. The compounds of Formula I may be used individually, or mixtures of them may be employed. They dissolve readily with stirring in the solvent. Specific examples of compounds which are useful within the scope of the present invention are set out in Table 1 and are numbered 3 through 22, respectively.

TABLE 1

| | |
|---|---|
| 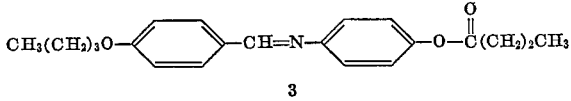<br>3 | 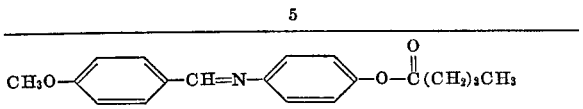<br>10 |
| 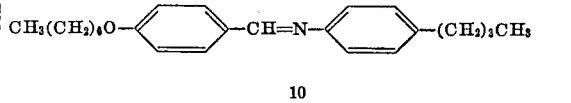<br>4 | 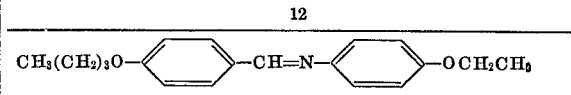<br>11 |
| 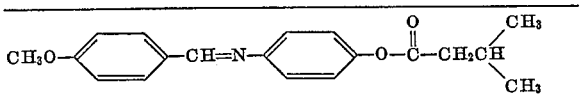<br>5 | 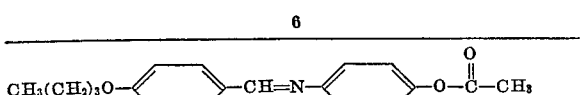<br>12 |
| 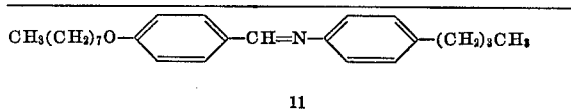<br>6 | 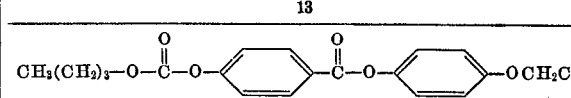<br>13 |
| 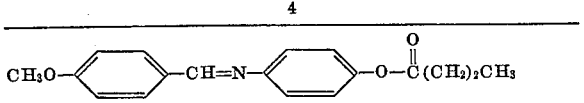<br>7 | 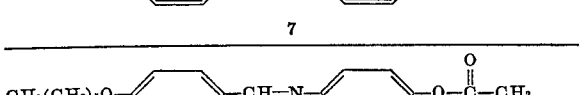<br>14 |
| 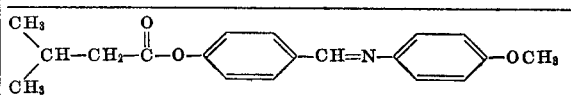<br>8 | 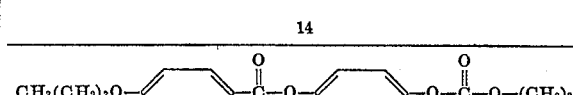<br>15 |
| 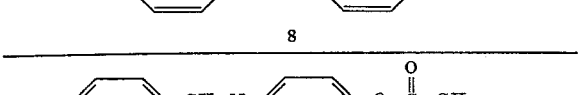<br>9 | 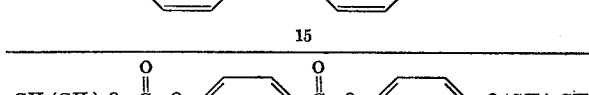<br>16 |

TABLE I—Continued

CH₃(CH₂)₃O—C(=O)—O—⟨C₆H₄⟩—CH=N—⟨C₆H₄⟩—O—C(=O)—CH₃

17

CH₃(CH₂)₃O—⟨C₆H₄⟩—CH=N—⟨C₆H₄⟩—O—C(=O)—O(CH₂)₃CH₃

18

CH₃(CH₂)₅O—⟨C₆H₄⟩—CH=N—⟨C₆H₄⟩—O—C(=O)—O(CH₂)₃CH₃

19

CH₃(CH₂)₃O—C(=O)—O—⟨C₆H₄⟩—CH=N—⟨C₆H₄⟩—OCH₂CH₃

20

CH₃(CH₂)₃O—C(=O)—O—⟨C₆H₄⟩—CH=N—⟨C₆H₄⟩—OCH₃

21

CH₃(CH₂)—C(=O)—O—⟨C₆H₄⟩—CH=N—⟨C₆H₄⟩—O—C(=O)(CH₂)₃CH

22

Table 2 sets forth 19 specific formulations made within the scope of the present invention. Compounds 1 and 2 are p-methylbenzylidene-p-n-butyl aniline and p'-n-butyl-phenyl-p-methyl benzoate, respectively.

TABLE 2

| Formulation number | Compound number | Percent by weight |
|---|---|---|
| 1 | 1 | 40 |
|   | 3 | 31 |
|   | 4 | 29 |
| 2 | 1 | 50 |
|   | 5 | 50 |
| 3 | 1 | 40 |
|   | 10 | 30 |
|   | 11 | 30 |
| 4 | 2 | 50 |
|   | 14 | 25 |
|   | 12 | 25 |
| 5 | 1 | 50 |
|   | 12 | 25 |
|   | 14 | 25 |
| 6 | 1 | 46.7 |
|   | 10 | 6.5 |
|   | 11 | 46.7 |
| 7 | 1 | 50 |
|   | 10 | 25 |
|   | 11 | 25 |
| 8 | 1 | 25 |
|   | 11 | 25 |
|   | 13 | 50 |
| 9 | 2 | 45 |
|   | 20 | 45 |
|   | 22 | 10 |
| 10 | 1 | 33 |
|   | 18 | 33 |
|   | 19 | 33 |
| 11 | 1 | 54 |
|   | 18 | 23 |
|   | 19 | 23 |
| 12 | 2 | 41 |
|   | 14 | 44 |
|   | 15 | 15 |
| 13 | 1 | 50 |
|   | 4 | 26 |
|   | 12 | 24 |
| 14 | 1 | 48 |
|   | 18 | 26 |
|   | 20 | 26 |
| 15 | 1 | 50 |
|   | 18 | 25 |
|   | 21 | 25 |
| 16 | 1 | 54 |
|   | 17 | 25 |
|   | 22 | 21 |
| 17 | 2 | 23 |
|   | 16 | 77 |
| 18 | 1 | 54 |
|   | 3 | 46 |
| 19 | 1 | 48 |
|   | 3 | 27 |
|   | 8 | 25 |

While the solvent is non-mesomorphic at room temperature, the resulting solution with the nematic compounds is mesomorphic. In addition, a different scattering efficiency can be obtained from these formulations by varying the composition. For instance, the scattering effect of a solution of compound 11 in p-methylbenzilidene-p-n-butyl aniline will be different at 40 percent solution as compared to 50 percent solution. This difference is due to the number of scattering centers created by the interaction of the liquid crystal compounds and the solvent.

In addition, the compositions have wider and lower temperatures of nematic mesophase than prior art compositions. For example, composition 1 in Table 2 has a mesophase between −20° to 51° C. The lowest solid-mesophase transition previously recorded was 10° C. This is the first time that the art has been presented with a room temperature guest-host alignment liquid crystal.

The formulations can be used in dynamic scattering mode between transparent electrodes for display system, as described by Heilmeyer, et al., Proc. IEEE 56 1162 (1968). In addition, they are use in light cells for ultraviolet photoactivated dynamic scattering mode as set forth in "Reversible Ultraviolet Imaging with Liquid Crystals," by J. D. Margerum, J. Nimoy, and S.-Y. Wong, Applied Physics Letter, vol. 17, No. 2, pages 51–53, 1970.

I claim:

1. A liquid crystal solution consisting essentially of from 50–80% of a compound corresponding to the formula

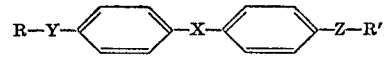

wherein

X=—CH=N or —C(=O)—O—

R and R' are each alkyl having from 1 to about 10 carbon atoms;

Y is O,

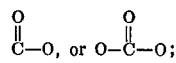, or 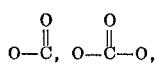;

Z is O,

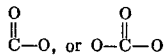, 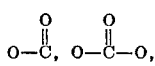, or a direct bond; dissolved in p'-n-butyl phenyl-p-methyl benzoate.

2. A liquid crystal solution consisting essentially of a compound corresponding to the formula

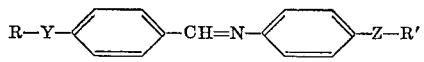

wherein
R and R' are each alkyl having from 1 to about 10 carbon atoms;
Y is O,

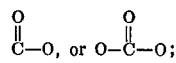, or 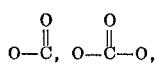

Z is O,

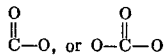, 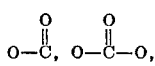, or a direct bond; dissolved in p'-n-butyl phenyl-p-methyl benzoate.

3. A liquid crystal solution consisting essentially of from 50–80% of a compound or a mixture of compounds corresponding to the formula

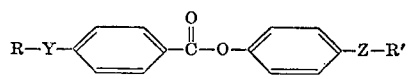

wherein
R and R' are each alkyl having from 1 to about 10 carbon atoms;
Y is O,

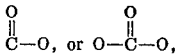, or 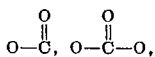,

Z is O,

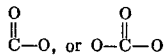, 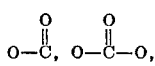, on a direct bond, dissolved in p'-n-butyl phenyl-p-methyl benzoate.

4. A solution of claim 2 wherein Y is O, and Z is

5. A solution of claim 2 wherein Y is O and Z is a direct bond.

6. A solution of claim 2 wherein Y is

and Z is O.

7. A solution of claim 2 wherein Y and Z are each O.

8. A solution of claim 2 wherein Y is

and Z is

9. A solution of claim 2 wherein Y is O, and Z is

10. A solution of claim 2 wherein Y is

and Z is O.

11. A solution of claim 3 wherein Y is

and Z is O.

12. A solution of claim 3 wherein Y is O and Z is

References Cited

UNITED STATES PATENTS 3,675,987   7/1972   Rafuse _____ 252—408 LC

FOREIGN PATENTS 2,017,727   4/1970   Germany _____ 252—408 LC

OTHER REFERENCES

Glen H. Brown, *Analytical Chemistry*, vol. 41, No. 13, November 1969, p. 28A.

RALPH S. KENDALL, Primary Examiner
JACQUELINE WARE, Assistant Examiner

U.S. Cl. X.R.

23—230 LC; 350—160 LC